March 22, 1938.　　A. R. KUZELEWSKI　　2,111,594
ELECTROHYDRAULIC SYSTEM
Filed March 10, 1934　　6 Sheets-Sheet 1

Inventor
Albert R. Kuzelewski
By Carl F. Sibbe
Attorney

March 22, 1938.  A. R. KUZELEWSKI  2,111,594
ELECTROHYDRAULIC SYSTEM
Filed March 10, 1934  6 Sheets-Sheet 4

Inventor
Albert R. Kuzelewski
By Carl F. Libbe
Attorney

March 22, 1938.  A. R. KUZELEWSKI  2,111,594
ELECTROHYDRAULIC SYSTEM
Filed March 10, 1934   6 Sheets-Sheet 5
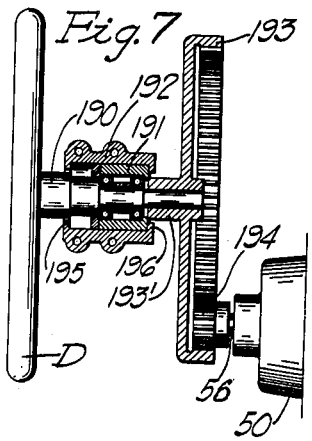
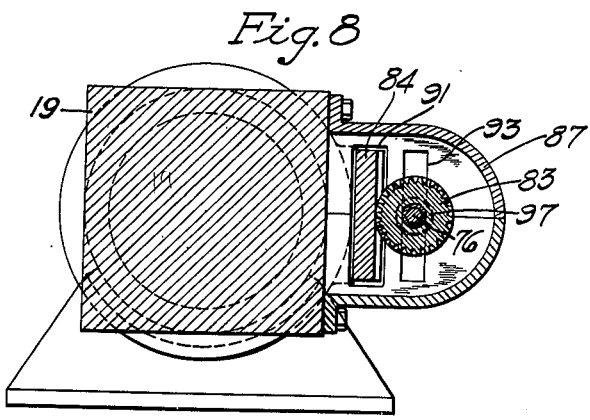
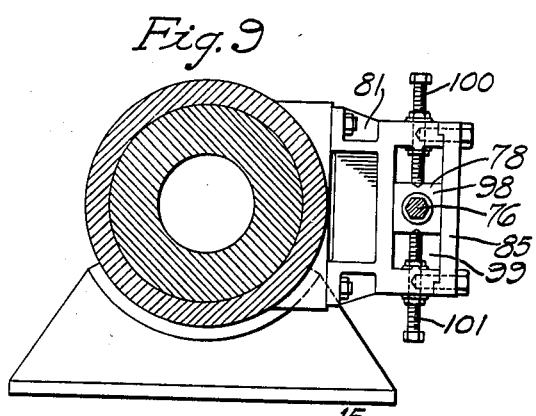
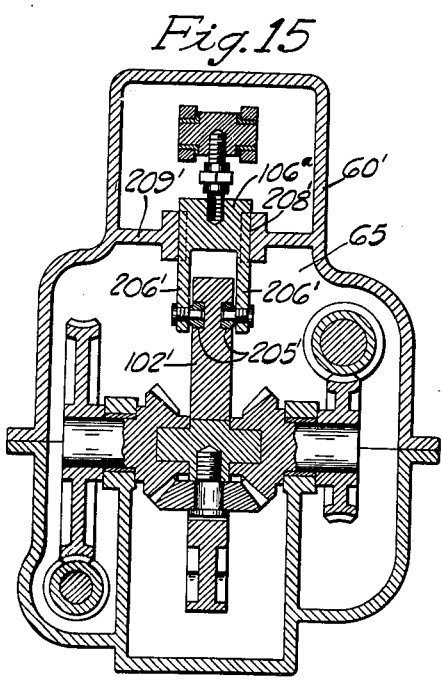
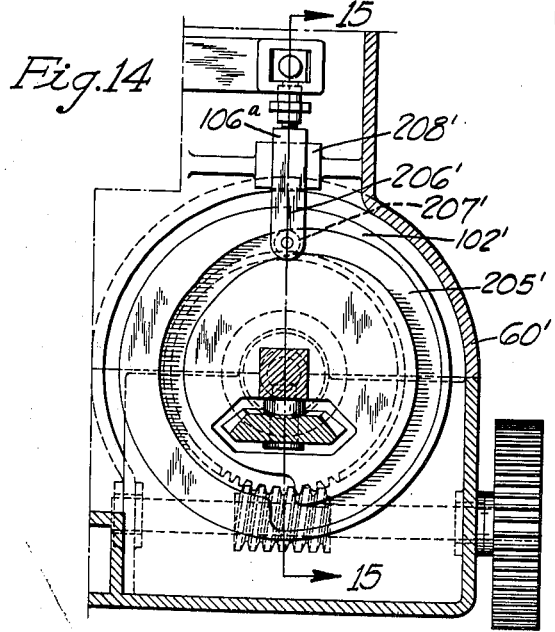
Inventor
Albert R. Kuzelewski
By Carl L. Sibbe
Attorney March 22, 1938.　　A. R. KUZELEWSKI　　2,111,594
ELECTROHYDRAULIC SYSTEM
Filed March 10, 1934　　6 Sheets-Sheet 6

Inventor
Albert R. Kuzelewski
By Carl L. Libbe
Attorney

Patented Mar. 22, 1938

2,111,594

UNITED STATES PATENT OFFICE 2,111,594

ELECTROHYDRAULIC SYSTEM

Albert R. Kuzelewski, Philadelphia, Pa., assignor to American Engineering Company, Philadelphia, Pa., a corporation of Pennsylvania Application March 10, 1934, Serial No. 714,960

15 Claims. (Cl. 60—52)

This invention relates to electrohydraulic systems, and particularly to electrohydraulic systems of the type employed to effect steering of ships and dirigibles.

One object of the present invention is to provide a generally improved system of the stated character wherein the various operating elements thereof are compactly arranged so as to require a minimum of space.

Another object is to provide an improved control mechanism for systems of the stated character including direct connected electrical and manual means, said manual means being adapted to be disengaged from the control mechanism during operation of said electrical means whereby the load imposed upon the latter is reduced to a minimum.

Another object is to provide in a system of the stated character, an improved stroke adjusting mechanism for pumps which positively effects various changes in stroke between neutral stroke and full stroke in either direction, and which retains said pump on full stroke during overtravel of the operating mechanism without causing any damage to the parts.

A further object is to provide an improved followup mechanism including a rotary shaft adapted to be positioned in various positions of adjustment.

A further object is to provide an improved trick wheel construction, including an adjustable bearing which permits ready attachment of the trick wheel with, or disengagement from the control mechanism associated therewith.

Other and further objects will become apparent as the description of the invention progresses.

Of the drawings:

Fig. 7 is a sectional side view of the trick wheel and gearing associated therewith, taken substantially along line 7—7 of Fig. 1.

Fig. 8 is a sectional view taken substantially along line 8—8 of Fig. 2.

Fig. 9 is a sectional view taken substantially along line 9—9 of Fig. 2.

Fig. 10 is a sectional view taken substantially along line 10—10 of Fig. 1.

Fig. 11 is a sectional view of the relief valve associated with the control mechanism.

Fig. 14 is an elevational view of the transmission mechanism with a portion of the casing removed, showing a modified cam arrangement.

Fig. 15 is a view taken substantially along line line 15—15 of Fig. 14.

Figure 1:
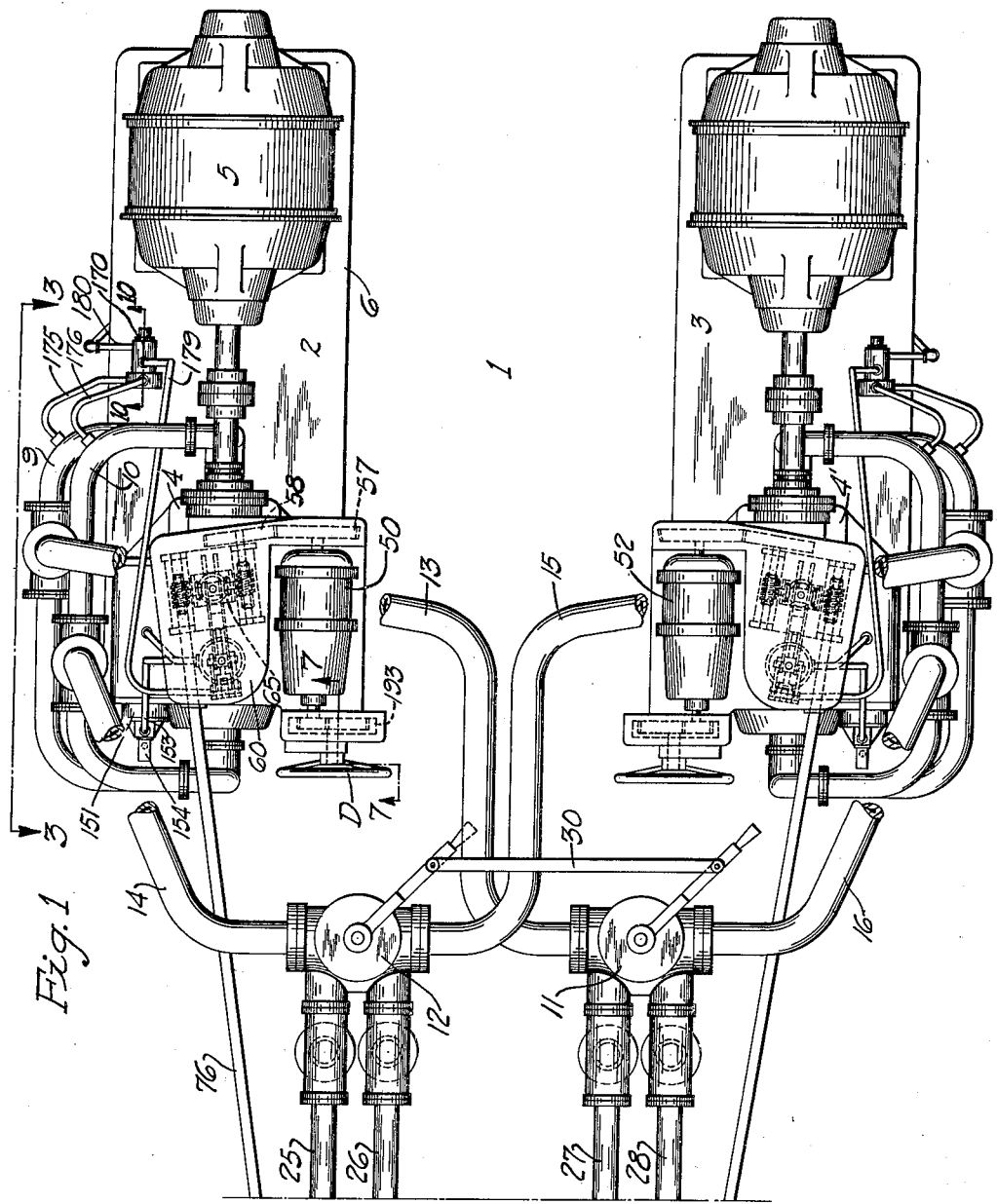
Fig. 1 is a plan view of a portion of the electrohydraulic system comprising the present invention, including the control mechanism associated therewith.

Referring to the drawings, the numeral 1 designates generally the control end of the system which, in the present instance, comprises a port unit 2 and a starboard unit 3. These units are identical in construction, and accordingly, a detailed description of the port unit only will be given herein.

Figure 2:
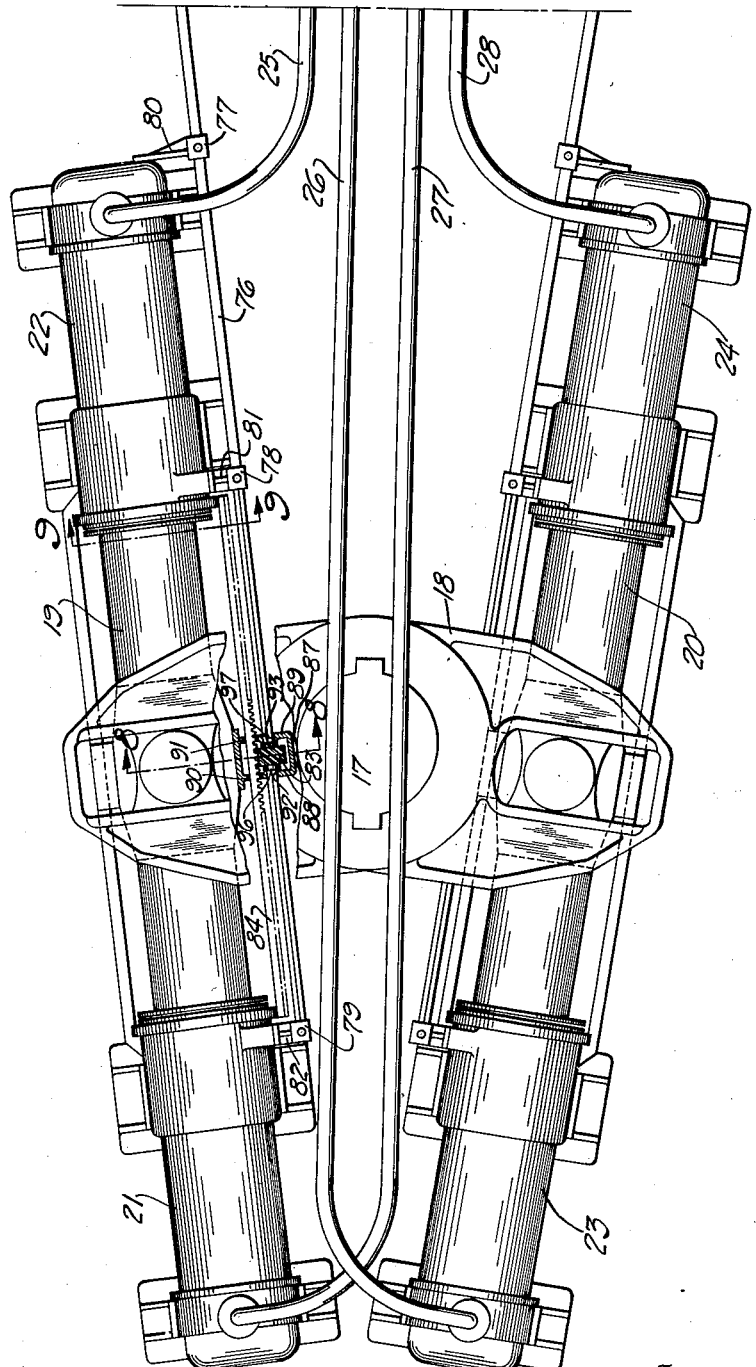
Fig. 2 is a continuation of the structure shown in Fig. 1 and discloses the rudder stock and the mechanism for actuating the same to different positions of adjustment.
Figure 12:
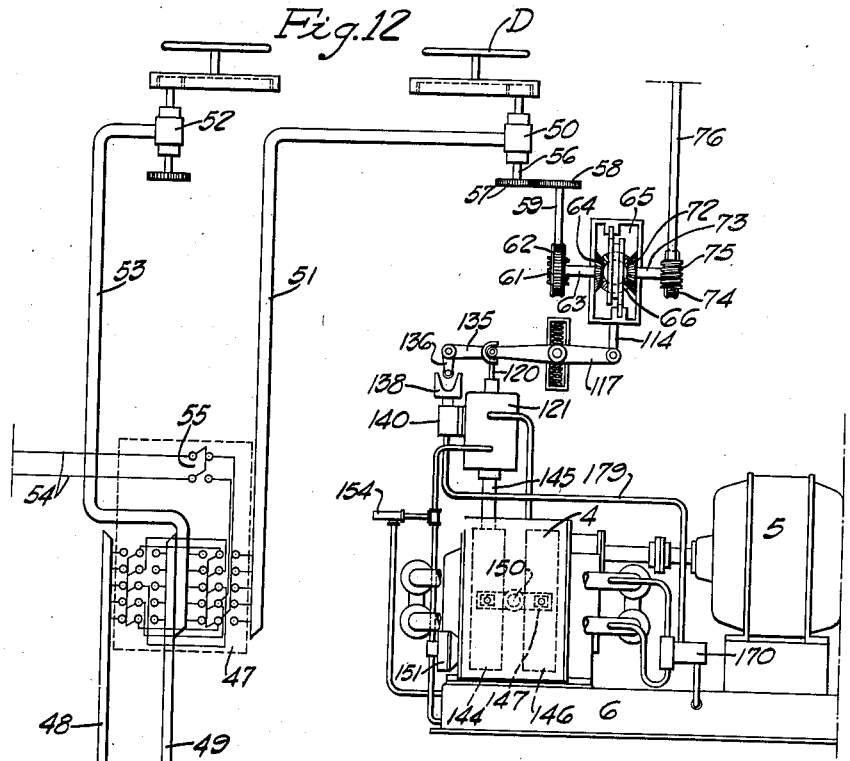
Fig. 12 is a diagrammatic view of the steering control mechanism including the electrical connections between the various steering stations and the control unit proper.

As shown more particularly in Figs. 1, 2, and 12, each unit comprises a variable stroke reversible discharge pump 4, driven by an electric motor 5. Pump 4 and motor 5 are mounted upon a makeup tank 6 from which makeup fluid may be drawn into the system through pipes 7 and 8 in a well known manner. Pump 4 is of the general type shown and described in my United States Patent No. 1,947,050, to which reference may be had for a complete disclosure thereof. In pumps of this general character the direction of discharge is controlled by the position of the sliding blocks thereof with respect to the neutral position. Thus, when the sliding blocks are moved in one direction from the neutral position, pressure is applied to a pipe 9 and suction to a pipe 10, and when the sliding blocks are moved in the reverse direction pressure is applied to pipe 10 and suction to pipe 9. Pipes 9 and 10 are connected respectively, to distributing valves 11 and 12 through pipes 13 and 14, as shown in Fig. 1. Pump 4' of the starboard unit is likewise connected to distributing valves 12 and 11 through pipes 15 and 16.

In the present instance the system is employed for adjusting the rudder of a ship. Referring more particularly to Fig. 2, it is seen that the rudder stock 17 is keyed to a crosshead 18 which is operatively connected to rams 19 and 20. Ram 19 operates in a pair of aligned cylinders 21 and 22, while the ram 20 likewise operates in a pair of aligned cylinders 23 and 24. A pair of pipes 25 and 26 leading from distributing valve 12 are connected, respectively, to cylinders 22 and 23, and a pair of pipes 27 and 28 leading from distributing valve 11 are respectively connected to cylinders 21 and 24. From this arrangement it is seen that when pressure is applied to distributing valve 12 by either pump 4 or 4' ram 19 will be moved to the left (Fig. 2) while ram 20 will be moved to the right, thereby causing crosshead 18 and rudder stock 17 to move in counterclockwise direction, thereby adjusting the rudder secured to the latter accordingly. It is also seen that when pressure is applied to distributing valve 11 ram 19 will be moved to the right, while ram 20 will be moved to the left, thereby causing crosshead 18 and rudder stock 17 to be moved in a clockwise direction. Distributing valves 11 and 12 are connected by a link and lever mechanism designated generally by the numeral 30, so that when in one position the pump 4 of the port unit will be operatively connected to the system, whereas the pump 4' of the starboard unit will be disconnected therefrom, and when adjusted to another position pump 4' of the starboard unit will be connected in the system while pump 4 of the port unit will be disconnected therefrom. Distributing valves of this general character are well known in the art, and accordingly, a detailed description thereof is unnecessary.

Referring to Fig. 12, it is seen that steering may be effected from a plurality of stations A, B and C, which may be located in different parts of the ship, or by a trick wheel D, located adjacent to the control unit proper. Steering wheels 31, 32, and 33 are provided at stations A, B and C respectively, which are geared to highly sensitive electric transmitters 34, 35, and 36. Conductors 37, 38, and 39 connect transmitters 34, 35, and 36 respectively, to a station switch S. Station switch S is provided with poles 40, 41, and 42 operatively connected to the transmitters 34, 35, and 36, respectively, and a contact arm 43 which is adapted to connect any one of said transmitters to said station switch and at the same time disconnect the others therefrom. A series of conductors 44 connect station switch S with the central poles 45 of a double throw switch 46. Switch 46 is connected to a second switch 47 through conductors 48 and 49. One side of switch 47 is connected to a highly sensitive receiver 50 of the port unit 2 through conductors 51, while the other side of said switch is connected to the receiver 52 of the starboard unit through conductors 53. Alternating current is supplied to the system from any suitable source through conductors 54 connected to switch 47, and a switch 55 is provided to interrupt the circuit during inoperative periods of the system.

One end of the armature shaft 56 of receiver 50 has secured thereto a pinion 57 which meshes with a gear 58 secured to one end of a shaft 59 journaled in a casing 60 secured to the upper surface of pump 4 in any suitable manner. The other end of shaft 59 has secured thereto a worm 61 which meshes with a worm wheel 62 keyed to one end of the extended hub 63 of a bevel gear 64 which forms one side of a differential gear 65. The hub 63 of bevel gear 64 is journaled in a suitable bearing provided at the upper end of an intermediate wall 94 of casing 60. Bevel gear 64 meshes with an intermediate bevel gear 66 journaled upon a stub shaft 69 secured to a block 70 shown more particularly in Fig. 5. Bevel gear 66 meshes with a second bevel gear 72 which forms the other side of differential gear 65. Block 70 is provided with laterally extending trunnions 67 and 68 which seat in bearing sockets provided in bevel gears 64 and 72 respectively. Bevel gear 72, like gear 64, is provided with an extended hub portion 73 journaled in a second intermediate wall 95, and the outer end thereof has keyed thereto a worm wheel 74 which meshes with a worm 75 secured to one end of a followup shaft 76. Followup shaft 76 is journaled in adjustable bearings 77, 78, and 79, respectively, provided adjacent cylinders 22 and 21, as shown in Fig. 2, and in suitable bearings provided in casing 60. Bearings 77 and 78 are mounted in brackets 80 and 81 secured to the inner side of cylinder 22, while bearing 79 is mounted in a similar bracket 82 extending inwardly from cylinder 21. The portion of shaft 76 extending between bearings 78 and 79 is substantially hexagonal in form and has slidably mounted intermediate the ends thereof a spiral gear 83 which meshes with a spiral rack 84 secured to and extending between cylinders 21 and 22. As shown in Figs. 2 and 8, spiral gear 83 is enclosed within a casing 87 which is secured to the inner side of ram 19 intermediate the ends of the latter. The side walls 88 and 89 of casing 87 are provided with vertical slots 90 and 91 for receiving rack 84. Adjacent to slots 90 and 91 are a second pair of slots 92 and 93 which receive shaft 76 and permit vertical adjustment thereof. Spiral gear 83 is provided with a pair of bushings 96 and 97 which abut against the inner faces of walls 88 and 89 respectively, of casing 87, and thus lateral movement of the spiral gear 83 within the casing is prevented. From the foregoing description it is seen that when crosshead 18 is swung in either direction by rams 19 and 20, a rotary motion will be imparted to the followup shaft 76 which, through its connection with bevel gear 72 of the transmission 65, will impart a movement to the operating parts thereof, as will appear more fully hereinafter.

The bearings 77, 78, and 79 for followup shaft 76 are similar in construction so that a description of one will suffice for all. Referring to Fig. 9, it is seen that the bearing 78 comprises a sliding block 98 which operates in a vertical slot 99 provided in bracket 81 and is supported in adjusted position by a pair of set screws 100 and 101. A strap 85 detachably secured to bracket 81 forms one wall of slot 99 and facilitates assembly and disassembly of the parts. Thus, in order to adjust the sliding block 98 of bearing 78 it is only necessary to adjust set screws 100 and 101 the proper amount. The purpose of these adjustable bearings is to insure proper alignment of the followup shaft 76. By this construction it is seen that the followup shaft may be connected directly to the transmission mechanism 65 and that universal connections may be entirely dispensed with. Such connections are usually undesirable due to the lost motion between the various joints. Referring to Fig. 8, it will be observed that rack 84 is comparatively deep. This construction permits the followup shaft 76 to be adjusted to different elevations and yet maintain an operative connection between the rack and the spiral gear secured to said shaft.

Figure 4:
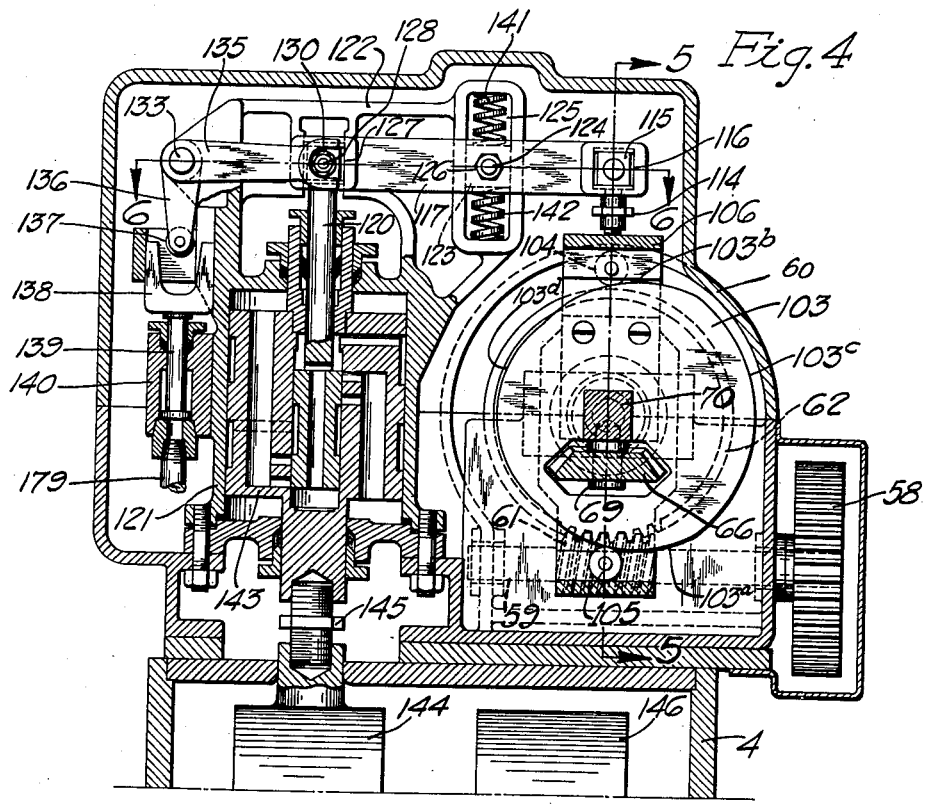
Fig. 4 is a sectional elevational view of the upper portion of the mechanism shown in Fig. 3.
Figure 5:
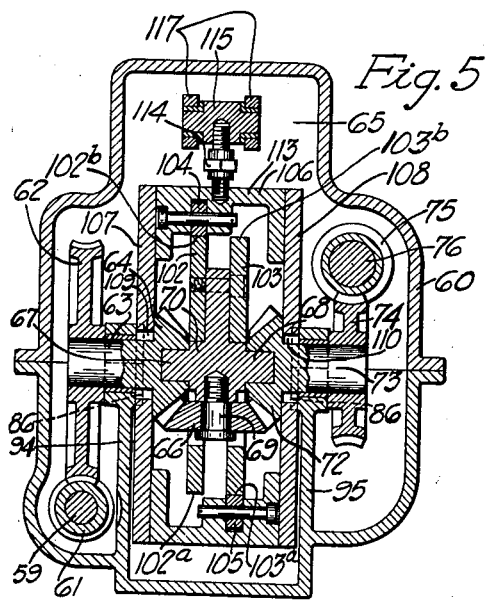
Fig. 5 is a sectional end view taken substantially along line 5—5 of Fig. 4.

Referring more particularly to Figs. 4 and 5, it is seen that the block 70 has secured thereto main and return cams 102 and 103, respectively, the peripheral surfaces of which are engaged by rollers 104 and 105, rotatably mounted in a cam follower 106. Cam 102 is provided with eccentric portions 102ª and 102ᵇ, and concentric portions 102ᶜ and 102ᵈ. Cam 103 is identical in construction to cam 102, and accordingly is provided with eccentric portions 103ª and 103ᵇ, and concentric portions 103ᶜ and 103ᵈ. Figs. 4 and 5 show the parts in normal position, wherein rollers 104 and 105 engage respectively the eccentric portions 102ᵇ and 103ª of cams 102 and 103 intermediate the ends thereof.

Figure 6:
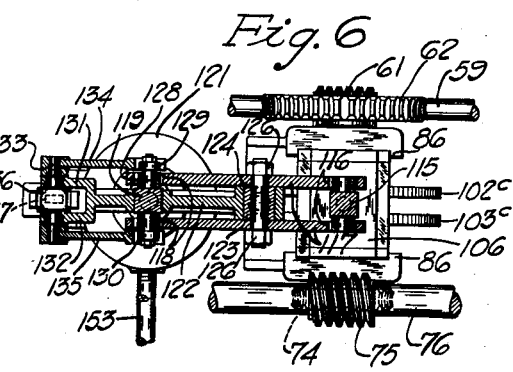
Fig. 6 is a sectional plan view taken substantially along line 6—6 of Fig. 4.

It therefore is seen that when the cams are moved in a clockwise direction (Fig. 4) cam follower 106 will be moved downwardly and when moved in a counterclockwise direction the cam follower will be moved upwardly. This movement of the cam follower continues until the concentric portions 102ᶜ or 102ᵈ of cam 102 engages roller 104 and concentric portions 103ᵈ or 103ᶜ of cam 103 engages roller 105, when no further motion is imparted to the cam follower. The concentric portions of cams 102 and 103 positively retain the cam follower in its upper and lower limiting positions of adjustment. By virtue of the concentric portions of cams 102 and 103 it is seen that in the event of overtravel of receiver 50, or trick wheel D, or of the followup mechanism no movement will be imparted to the cam follower and thus damage to the operating parts is prevented. Cam follower 106 is substantially of box-like construction and the side walls 107 and 108 thereof are provided with vertical slots 109 and 110 which receive the hub portions 63 and 73 of bevel gears 64 and 72 respectively, of the differential gear 65. The side walls 107 and 108 of cam follower 106 extend respectively, into guide recesses 86, 86 provided in intermediate walls 94 and 95 of casing 60. Thus lateral movement of cam follower 106 is prevented. The upper cross member 113 of cam follower 106 has secured intermediate the ends thereof, the lower end of an adjustable bolt 114, the upper end of which is secured to a sliding block 115 mounted in a pair of aligned rectangular slots 116 provided at the right hand ends of a pair of spaced levers 117. The left hand ends of levers 117 are also provided with a pair of aligned rectangular slots 118 in which is mounted a sliding block 119, which in turn is connected to a valve 120 of a servo motor 121. Levers 117 extend on either side of a supporting framework 122 secured to and extending upwardly from the casing of servo motor 121. A third sliding block 123 is pivotally mounted intermediate the ends of levers 117 on a pin 124, and operates in a vertical slot 125 provided in framework 122. A pair of nuts 126 retain levers 117 in close juxtaposition to the enlarged portion of framework 122 adjacent slot 125. The sliding block 119 provided at the left hand end of levers 117 also operates in a vertical slot 127 provided in framework 122. A pin 128 extends through sliding block 119 and has mounted on the opposite ends thereof a pair of rollers 129 and 130. As shown in Figs. 4 and 6, the left hand end of framework 122 is provided with a pair of ears 131 and 132 through which a pin 133 is journaled. Secured to the opposite ends of pin 133 are a pair of substantially horizontal arms 134 and 135, the inner ends of which are bifurcated to receive rollers 129 and 130 respectively. Also secured on pin 133, intermediate ears 131 and 132 is a substantially vertical arm 136 having a roller 137 rotatably mounted at the lower end thereof. Roller 137 is operatively associated with a substantially U-shaped cam member 138 secured to the upper end of piston 139 of a fluid motor 140 secured in any suitable manner to the casing of servo motor 121. Mounted in slot 125 on either side of sliding block 123 are a pair of coil springs 141 and 142 which form a fulcrum for levers 117.

From the construction of the mechanism just described it will be seen that upon rotation of cams 102 and 103 in either direction a rocking movement will be imparted to levers 117 about springs 141 or 142 as a pivot, thereby causing actuation of valve 120 of servo motor 121. At the same time arms 134, 135, and 136 will be swung from normal position through their connection with levers 117. It is also seen that if piston 139 is now operated cam 138 will engage roller 137 and actuate arms 136, 134, and 135, as well as valve 120 toward normal position. Upon operation of cam member 138 in this manner levers 117 will be actuated against the springs 141 or 142, inasmuch as the right hand ends thereof are held against free movement by their connection with cams 102 and 103.

Servo motor 121 comprises a piston 143, the lower end of which is connected to one of the sliding blocks 144 of pump 4 by means of an adjustable bolt 145. The specific construction of servo motor 121 forms no part of the present invention, and therefore a detailed description thereof is unnecessary. For a complete disclosure of servo motors of this kind reference may be had to the United States Patent of Robert C. Lamond No. 1,986,640. Suffice it to say, that when the valve 120 of servo motor 121 is moved in one direction from normal position, internal ports will be opened which permit fluid to flow therethrough from a source which will be described hereinafter, causing the plunger 143 thereof to move in one direction, thereby actuating sliding block 144 of pump 4 correspondingly, and when said valve 120 is moved in the reverse direction from normal position, piston 143 will be moved in the reverse direction to thereby actuate the sliding block 144 of pump 4 in the reverse direction.

Referring to Fig. 12, it will be observed that pump 4 is provided with a second sliding block 146. Sliding blocks 144 and 146 are connected for simultaneous movement in opposite directions by a lever 147 pivoted at 150 to one of the end walls of the pump casing. It therefore is seen that when sliding block 144 is actuated in the manner just described by piston 143, sliding block 146 will be simultaneously operated an equal amount in the opposite direction.

Fluid pressure for actuating servo motor 121 is supplied by a small pump 151 operatively connected to the rotating cylinder body (not shown) of pump 4 in any suitable manner. Pump 151 draws fluid from makeup tank 6 through a pipe 152, and delivers fluid under pressure to servo motor 121 through a pipe 153. When the plunger 143 of servo motor 121 is fully operated in either direction considerable pressure would build up in the system if no means were provided to relieve the pressure under such conditions. In order to permit an outlet for the fluid when the plunger 143 has been fully operated in either direction a relief valve 154 is provided.

Figure 3:
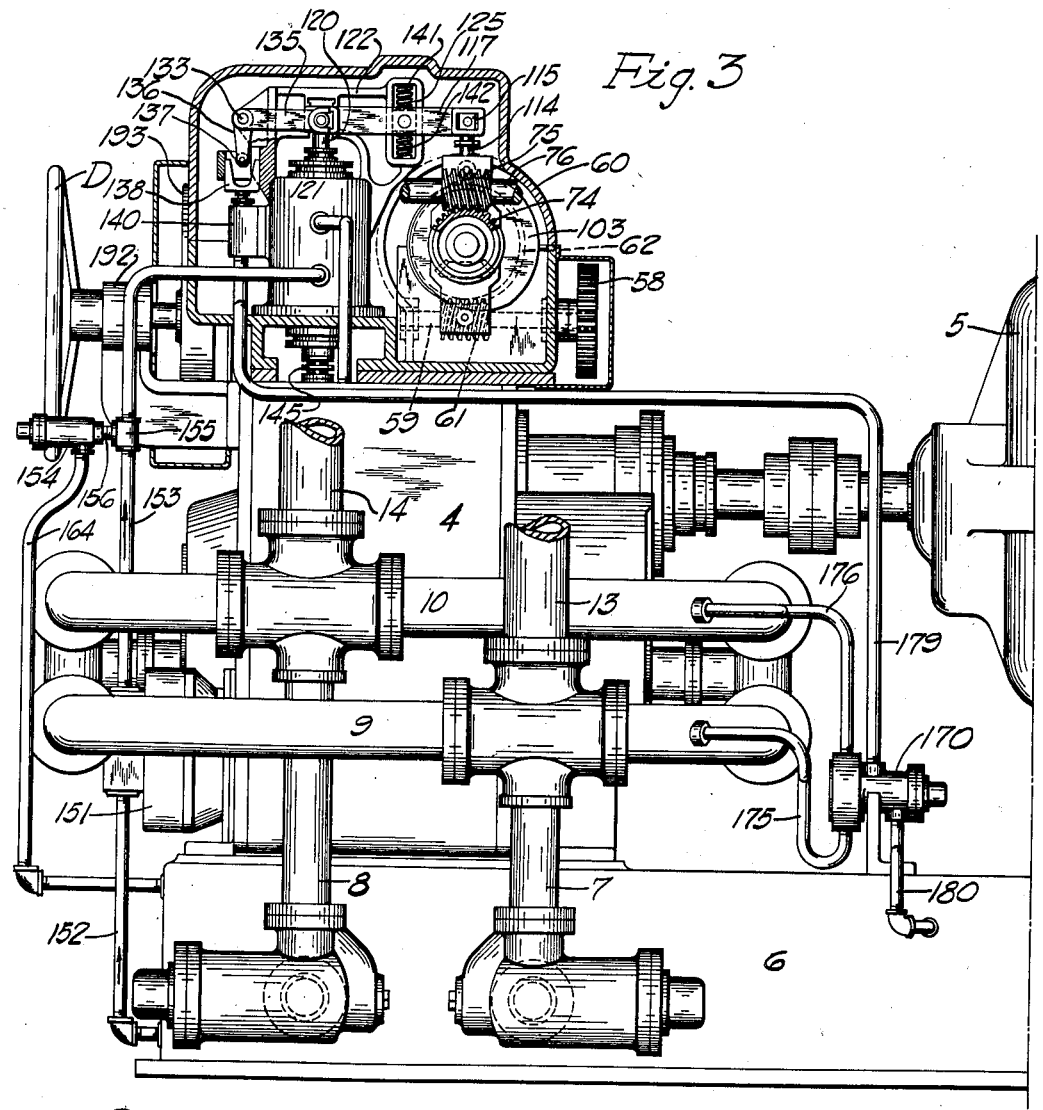
Fig. 3 is an elevational view taken substantially along line 3—3 of Fig. 1, with the elements shown in reversed position.

Referring more particularly to Figs. 3 and 11, it is seen that pipe 153 is provided with a T coupling 155 intermediate the ends thereof having a short pipe connection 156 leading therefrom to the inlet opening 157 of relief valve 154. Chamber 157 communicates with a second chamber 158 and a valve 159 normally prevents the passage of fluid therebetween. Valve 159 is normally retained in closed position by a coil spring 160 extending between valve 159 and an adjustable spring seat 161 provided near the left hand end of chamber 158. The tension of spring 160 may be adjusted by means of a set screw 163 provided at the left hand end of valve 154. A pipe 164 connects chamber 158 of valve 154 with the makeup tank 6. It therefore is seen that when the pressure developed by pump 151 exceeds the tension of spring 160 valve 159 is moved to the left and permits fluid to pass from pipe 153 through chambers 157 and 158, and thence discharges back to the makeup tank 6 through pipe 164. It will also be observed that when the pressure developed by pump 151 falls below the tension of spring 160 the latter will urge valve 159 against its seat to prevent further passage of fluid from the system.

Operatively associated with fluid motor 140 is a control unit 170 which operates to establish communication between said motor and pump 4 when the pressure in the latter exceeds a predetermined value. Control unit 170 comprises a casing 171 having substantially horizontal and vertical chambers 172 and 173 provided therein separated by a partition 174. A pair of pipes 175 and 176 connect pipes 9 and 10 with the lower and upper ends of chamber 173 and a series of apertures 177 establish communication between chambers 172 and 173. A shuttle valve 178 operating in chamber 173 is adapted to engage valve seats provided at each end of chamber 173 to prevent fluid entering said chamber through pipes 175 or 176 from passing back to pump 4. Chamber 172 is connected to fluid motor 140 by a pipe 179, while a second pipe 180 connects said chamber to makeup tank 6. Mounted in chamber 172 is a valve 181 which, when in normal position as shown in Fig. 10, prevents the passage of fluid from pump 4 to motor 140. A spring 182 extending between valve 181 and an adjustable spring seat 183 retains the valve in normal position. Valve 181 is provided with a pair of ports 184 and 185 which establish communication between pipes 179 and 180 when the valve is in normal position, thereby permitting fluid from motor 140 and pipe 179 to drain to makeup tank 6. By this construction it is seen that in the event that the pressure in the system exceeds the tension of spring 182, valve 181 will be forced to the right (Fig. 10) thereby establishing communication between pipe 9 or 10, whichever is delivering fluid under pressure from pump 4, and motor 140. When this occurs piston 139 will be moved upwardly (Fig. 4) causing cam member 138 to adjust valve 120 toward neutral position. Upon adjustment of valve 120 in this manner, fluid entering servo motor 121 through pipe 153 will actuate piston 143 toward neutral position thereby causing sliding blocks 144 and 146 of pump 4 to also move toward neutral position. When the pressure in the system falls below that of spring 182 the latter will urge plunger 181 to the left, and thereby disconnect motor 140 from the pressure in the system. The fluid delivered to motor 140 and pipe 179 will then discharge through ports 184 and 185, and into the right hand end of chamber 172 from which it will drain back to makeup tank 6 through pipe 180. Piston 139, and consequently cam member 138, will then move to normal position by gravity.

Under certain conditions it may be desirable to effect steering directly through mechanical connections rather than through the electrical transmitters 34, 35, or 36. To this end a trick wheel D is provided. As shown more clearly in Figs. 3, 7, and 12, trick wheel D is secured to one end of a shaft 190 mounted in an adjustable roller bearing block 191 which in turn is mounted in a bearing bracket 192 secured to and extending outwardly from pump 4. The inner end of shaft 190 is secured to the hub 193' of a large internal gear 193. Internal gear 193 meshes with a small gear 194 secured to the armature shaft 56 of receiver 50. It therefore is seen that upon rotation of trick wheel D, valve 120 of servo motor 121 may be directly adjusted through the connections previously described. Bearing bracket 192 is provided with internal flanges 195 and 196 at the opposite ends thereof which act as stops for the roller bearing mounted therein. By this construction, it is seen that when trick wheel D is not in operation internal gear 193 may be disconnected from gear 194 by simply moving the trick wheel to the left, until bearing block 191 engages the left hand flange 195. When it is desired to again use the trick wheel, it is only necessary to urge the same to the right until bearing block 191 engages flange 196 at which time gears 193 and 194 will be in mesh.

Figure 13:
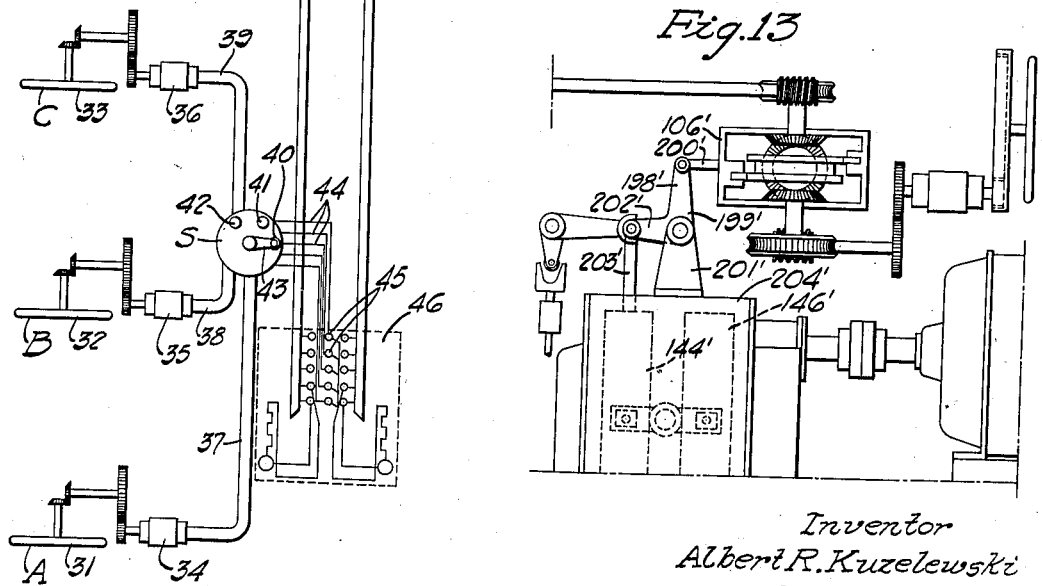
Fig. 13 is a diagrammatic view of a portion of the control mechanism of an alternative construction.

Under certain conditions it may also be desirable to dispense with servo motor 121 and to adjust the stroke of pump 4 directly from the cam follower 106. A mechanism of this character is shown in Fig. 13, wherein it will be observed that the cam follower 106' is operatively connected to the upper arm 198' of a bell crank lever 199' by a link 200'. Bell crank lever 199' is pivotally mounted in a bracket 201' secured to the upper surface of pump 204'. The substantially horizontal arm 202' of bell crank 199' is connected to sliding block 144' of pump 204' by means of a link 203'. By this construction, it is seen that upon movement of cam follower 106' in either direction sliding blocks 144' and 146' of pump 204' will be adjusted a corresponding amount.

In Figs. 14 and 15 I have shown an alternative cam construction for controlling the stroke adjusting mechanism of the pump. In this arrangement a single cam disc 102' is shown having cam slots 205' provided in each side thereof. The cam follower 106ª is provided with a pair of depending arms 206' having rollers 207' rotatably mounted at the lower ends thereof, which extend into the cam slots 205'. By this construction it is apparent that upon movement of cam disc 102' in either direction cam follower 106ª will be moved upwardly or downwardly, depending upon the direction of movement of said cam disc. Cam follower 106ª is guided for reciprocation in an aperture 208' provided in the web 209' of casing 60'. It is apparent that a single cam slot provided in disc 102' may be employed to actuate cam follower 106ª, but the construction herein shown insures more efficient operation.

From the foregoing description, the structure and operation of my improved hydraulic system is thought to be obvious. However, in order to correlate the various elements thereof a brief description of the operation of the device as a whole will now be given.

Let us assume that the port unit 2 is in operation, and that it is desired to effect steering from station A. The operator first moves contact arm 43 of station switch S into contact with pole 40. Switches 46, 47, and 55 are then closed so as to connect selsyn receiver 50 associated with the port unit 2 into operative relation with transmitter 34. Now, upon operation of steering wheel 31, transmitter 34 will be actuated a corresponding amount which movement is simultaneously transmitted to receiver 50, which in turn actuates bevel gear 64 through gears 57, 58, 61, and 62. Upon operation of bevel gear 64 in this manner bevel gear 66, and consequently cams 102 and 103 will be swung about trunnions 67 and 68 as a pivot. At this time crosshead 18 is stationary, and consequently bevel gear 72 is held against movement. As a result bevel gear 66 simply rolls on bevel gear 72 without imparting any movement thereto. Upon movement of cams 102 and 103 in this manner the cam surfaces 102$^b$ and 103$^a$ thereof engaging rollers 104 and 105 provided in cam follower 106 cause the latter to be moved either upwardly or downwardly, depending upon the direction of rotation of steering wheel 31. This motion is transmitted to levers 117 which swing about springs 141 or 142 as a pivot, thereby causing adjustment of valve 120 of servo motor 121 a corresponding amount. When this occurs internal ports within the servo motor are uncovered whereby fluid discharging from pump 151 will actuate piston 143 and consequently sliding blocks 144 and 146 of pump 4 to place the latter on stroke.

Let us assume that the stroke of pump 4 has been adjusted so as to cause the latter to deliver pressure through pipe 9 and suction to pipe 10. Fluid under pressure will then enter cylinders 21 and 24 through pipes 27 and 28, distributing valve 11, and pipe 13, causing rams 19 and 20 to actuate crosshead 18 in a clockwise direction. Upon movement of crosshead 18 in this manner the stationary rack 84 will effect rotation of spiral gear 83 and consequently followup shaft 76, which through worm gear 75 and worm wheel 74 will actuate bevel gear 72. Upon actuation of bevel gear in this manner, bevel gear 66, and consequently cams 102 and 103, will be rotated in the reverse direction from which they were operated by hand wheel 31, with the result that levers 117 will effect adjustment of valve 120 of servo motor 121 toward neutral position. The internal ports between plunger 143 and valve 120 of servo motor 121 will again be uncovered to permit fluid delivered by pump 151 to actuate piston 143 in the reverse direction toward neutral position causing sliding blocks 144 and 146 of pump 4 to also be actuated toward neutral position. Rams 19 and 20, and consequently the rudder adjusted thereby, will now remain in adjusted position until steering wheel 31 is again operated. When plunger 143 has been operated to adjusted position as determined by the position of valve 120, the internal ports are closed causing the pressure delivered by pump 151 to gradually build up. When this pressure exceeds the tension of spring 160 of relief valve 154, valve 159 thereof will be moved to the left, thereby permitting fluid from pump 151 to bypass through chambers 157 and 158 of said valve, and thence drain back to the makeup tank 6 through pipe 164.

If during operation of the rams 19 and 20 an abnormal pressure should develop in the system, such as would be caused by a heavy wave striking the rudder, damage to the operating parts may occur, if no means were provided to discontinue, at least to a certain extent, the pumping action of pump 4. In order to prevent such abnormal pressures in the system, I provide a fluid motor 140 which functions to effect a reduction in the stroke of pump 4 when the pressure exceeds a predetermined value.

Referring to Figs. 3 and 10, when the pressure in the system exceeds the tension of spring 182, valve 181 will be urged to the right, and thereby establishing communication between pump 4 and motor 140, causing piston 139 of the latter to actuate cam member 138 upwardly into engagement with roller 137. This action causes arms 136, 134, and 135 to swing about their pivotal connection thereby actuating valve 120 toward neutral position. When this occurs piston 143 of servo motor 121 will be actuated by fluid pressure from pump 151 causing a movement of sliding blocks 144 and 146 of pump 4 toward neutral position and thereby reducing the pumping action of the latter. The load imposed upon motor 5 as well as other operating parts, is now reduced, and damage thereto is avoided.

Referring to Figs. 1, 3, 4, 5, and 15, it is seen that the servo motor 121, the gear transmission 65, levers 117 and associate parts are all enclosed within a casing mounted upon pump 4. Receiver 50 is also suitably mounted upon pump 4 adjacent to the servo motor 121 and gear transmission 65. This arrangement affords a compact unit which occupies a minimum of space which usually is at a premium on board ships or dirigibles. This arrangement also renders the various elements readily accessible to the operators.

Referring more particularly to Figs. 4 and 14, it will be observed that the cams are provided with eccentric surfaces which are so designed as to afford adjustment of the stroke of the pump from neutral position to a maximum position in either direction, and concentric portions which are engaged by the rollers of the cam followers after the stroke has been adjusted the maximum amount. By this arrangement when the stroke of the pump has been adjusted a maximum amount in either direction the mechanism will be held in adjusted position regardless of whether the steering wheels are further operated. This construction prevents damage to the parts in case the steering wheels overtravel the distance required to produce a full stroke adjustment of the pump in either direction.

It is also seen that the cams are adjusted directly by the receiver 50 through differential gear 65. This construction provides a simple operating mechanism which operates in a highly efficient manner. During operation of hand wheel 31, 32, or 33 the trick wheel D, and consequently the internal gear 193 connected thereto are disengaged from the receiver 50, thereby permitting operation of the latter with a minimum of effort. The other side of the differential gear is connected to a followup mechanism including a single shaft mounted in adjustable bearings. By this construction lost motion which is usually caused by universal joints, links, and levers for transmitting the followup motion is eliminated. The construction, as a whole, therefore constitutes but a few simple parts which are so arranged as to not only occupy a minimum of space, but eliminates the lost motion present in the numerous motion transmitting devices of the older constructions.

While the embodiments herein described are admirably adapted to fulfill the objects primarily stated it is to be understood that the invention is not to be limited to the embodiments shown, since it may be embodied in other forms, all coming within the scope of claims which follow.

What is claimed is:

1. In a device of the class described, the combination with a fluid motor comprising a ram, of a pump for actuating said ram in either direction, means for varying the discharge of said pump, a differential gear operatively connected to said means, manual means operatively connected to one side of said differential gear, and a followup mechanism operatively connecting the other side of said gear to said ram, said followup mechanism including a shaft, a spiral gear slidably mounted on said shaft, a fixed rack meshing with said spiral gear, a casing secured to said ram housing said spiral gear, and means provided in said casing permitting relative movement of the latter, said rack and said shaft, said parts being so constructed and arranged that upon movement of said ram in either direction a rotary movement is imparted to said spiral gear and followup shaft.

2. In a device of the class described, the combination with a fluid motor, of a pump for actuating said motor, means for varying the discharge of said pump including a differential gear, manual means operatively connected to one side of said differential gear, a followup mechanism operatively connecting the other side of said differential gear to said fluid motor including a rotatable substantially horizontal shaft, said fluid motor comprising a reciprocable ram and a pair of aligned cylinders embracing the opposite ends of said ram, a stationary rack secured to said cylinders, a spiral gear slidably mounted on said shaft and meshing with said rack, a casing secured to said ram and housing said gear, and adjustable bearings for said shaft whereby the elevation thereof may be varied.

3. In a device of the class described, the combination with a fluid motor, having a ram operating therein, a pump for actuating said ram, control means for varying the discharge of said pump, and a followup mechanism for adjusting said pump to neutral when the ram is operated a predetermined distance in either direction, said followup comprising a rotatable substantially horizontal shaft, a gear mounted on said shaft, and a relatively deep stationary rack secured to said motor, adjustable bearings for said shaft whereby the latter may be adjusted vertically, said parts being so constructed and arranged that said gear will remain in mesh with said rack throughout the range of adjustment of said shaft.

4. In a device of the class described, the combination with a variable stroke, reversible discharge pump, of means for controlling the stroke and direction of discharge of said pump including a floating lever, a resiliently yieldable fulcrum for said lever provided intermediate the ends thereof, cam means operatively connected to one end of said lever for adjusting the latter to various positions of adjustment, fluid pressure means for adjusting said lever toward normal position when the pressure developed by said pump exceeds a predetermined value, means providing a lost motion connection between said fluid pressure means and said lever, and a valve unit for controlling the operation of said fluid pressure means, said valve unit comprising a casing, communicating chambers provided in said casing, means connecting one of said chambers with said pump, means connecting the other of said chambers with said fluid pressure means, a valve normally preventing the passage of fluid from said pump to said fluid pressure means, resilient means for retaining said valve in closed position, means for adjusting the tension of said resilient means and ports provided in said valve, through which fluid from said fluid pressure means may pass to said second mentioned chamber, when said valve is in closed position, and means connecting said second mentioned chamber to exhaust.

5. In a device of the class described, the combination with a fluid motor, of a variable stroke, reversible discharge pump for actuating said motor, means for controlling the stroke and direction of discharge of said pump including a servo motor, a valve for controlling the operation of said servo motor, a floating lever operatively connected to said valve, a resiliently yieldable fulcrum for said lever provided intermediate the ends thereof, cam means operatively connected to one end of said lever for adjusting the latter, and consequently said valve, to various positions of adjustment, means for actuating said cam means, followup means actuated by said fluid motor for returning said cam means to normal position after adjustment by said actuating means, a second pump for actuating said servo motor upon adjustment of said valve, a relief valve disposed between said second mentioned pump and said servo motor through which fluid from said pump passes to exhaust when said servo motor has been fully operated, fluid pressure means for adjustnig said floating lever, and consequently said valve, toward normal position when the pressure developed by said first mentioned pump exceeds a predetermined value, means providing a lost motion connection between said fluid pressure means and said lever, and a valve unit operatively connecting said fluid pressure means with said first mentioned pump, comprising a casing, a valve provided in said casing normally preventing the passage of fluid from said pump to said fluid pressure means, spring means for retaining said valve in closed position, said valve being adjusted to open position to establish communication between said first mentioned pump and said fluid pressure means when the pressure in said pump exceeds the tension of said spring, and means for adjusting the tension of said spring.

6. In a device of the class described, the combination with a fluid motor, of a variable stroke, reversible discharge pump for actuating said motor, means for controlling the stroke and direction of discharge of said pump including a servo motor, a valve controlling the operation of said servo motor, a floating lever operatively connected to said valve, a resiliently yieldable fulcrum for said lever provided intermediate the ends thereof, cam means operatively connected to one end of said lever for adjusting the latter, and consequently said valve, to various positions of adjustment to condition said servo motor for operation, a differential gear for actuating said cam means, manual means operatively connected to one side of said differential gear, and followup means connecting the other side of said differential gear to said fluid motor, a second pump for actuating said servo motor when the valve associated therewith has been adjusted by said manual means or followup mechanism, a relief valve disposed between said second mentioned pump and said servo motor, through which fluid from said pump passes to exhaust when said servo motor has been fully operated in either direction, and fluid pressure means for adjusting said floating lever, and consequently the valve associated with said servo motor toward normal position when the pressure developed by said first mentioned pump exceeds a predetermined value, means providing a lost motion connection between said fluid pressure means and said floating lever, and a valve unit operatively connecting said fluid pressure means and said first mentioned pump having a spring urged valve provided therein, said last mentioned valve being actuated against the tension of said spring to establish communication between said first mentioned pump and said fluid pressure means when the pressure in said pump exceeds a predetermined value, and ports provided in said last mentioned valve whereby the fluid delivered to said fluid pressure means may drain to exhaust when said valve is in closed position.

7. In a device of the class described, the combination with a fluid motor, of a variable stroke, reversible discharge pump for actuating said motor, control means for regulating the stroke and direction of discharge of said pump including a rotary cam, a differential gear operatively connected to said cam, a synchronous receiver connected to one side of said differential gear, a manually operable synchronous transmitter connected to said receiver, and hand wheel mechanism directly connected to said receiver, said hand wheel mechanism being so constructed as to permit ready disengagement thereof from said receiver whereby the load imposed upon said receiver is reduced to a minimum, and followup mechanism operatively connecting the other side of said differential gear with said motor.

8. In a device of the class described, the combination with a fluid motor, of a variable stroke, reversible discharge pump for actuating said motor, control means for adjusting the stroke and direction of discharge of said pump, including a rotary cam mechanism, a differential gear operatively connected to said cam mechanism, a synchronous receiver operatively connected to one side of said differential gear, a manually operable synchronous transmitter for actuating said receiver, a hand wheel mechanism directly connected to said receiver and being adapted for disengagement therefrom during operation of said synchronous transmitter, whereby the load imposed upon said receiver is reduced to a minimum, and a followup mechanism including a single shaft operatively connecting the other side of said differential gear with said motor.

9. In a device of the class described, the combination with a fluid motor, of a variable stroke, reversible discharge pump for actuating said motor, stroke adjusting means for said pump, a lever supported on said pump and operatively connected to said stroke adjusting means, a cam supported on said pump for actuating said lever, a differential gear supported on said pump for actuating said cam, manual actuating means supported on said pump and operatively connected to one side of said differential gear, and followup means connecting said motor to the opposite side of said differential gear, and a casing supported on said pump housing said stroke adjusting means, lever, cam and differential gear.

10. In a device of the class described, the combination with a variable stroke reversible discharge pump, of means actuated by said pump, stroke adjusting means for said pump, a floating lever supported on said pump and operatively connected to said stroke adjusting means, rotary cam means supported on said pump for actuating said lever, mechanism supported on said pump for actuating said cam means, additional means supported on said pump for actuating said lever when the pressure developed by said pump exceeds a predetermined value, and followup means operatively connecting said first mentioned means with said cam means.

11. In a device of the class described, the combination with a fluid motor, of a variable stroke reversible discharge pump for actuating said motor, stroke adjusting means for said pump, a lever supported on said pump and operatively connected to said stroke adjusting means, a cam supported on said pump for actuating said lever, a differential gear supported on said pump for actuating said cam, manual actuating means supported on said pump and operatively connected to one side of said differential gear, and followup mechanisms operatively connecting said motor to the other side of said differential gear.

12. In a device of the class described, the combination with a variable stroke, reversible discharge pump, of stroke adjusting elements for said pump, means for controlling the stroke and direction of discharge of said pump, said means including a floating lever, a resiliently yieldable fulcrum for said lever provided intermediate the ends thereof, means connecting one end of said lever to said stroke adjusting elements, means operatively connected to the other end of said lever for adjusting the latter to various positions of adjustment, a second lever operatively connected to said first mentioned lever, fluid pressure means for actuating said second mentioned lever, means providing a lost motion connection between said fluid pressure means and said second lever, and means connecting said fluid pressure means to the pressure side of said pump whereby when said pressure exceeds a predetermined value said levers will actuate said stroke adjusting elements toward neutral position.

13. In a device of the class described, the combination with a variable stroke, reversible discharge pump, of stroke adjusting elements for said pump, means for controlling the stroke and direction of discharge of said pump including a floating lever, means connecting said lever to said stroke adjusting elements, a resiliently yieldable fulcrum for said lever provided intermediate the ends of the latter, cam means operatively connected to one end of said lever for adjusting the latter to various positions of adjustment during a portion of its movement, and for holding said lever in adjusted position during another portion of its movement, a second lever operatively connected to said first mentioned lever, means for actuating said levers to effect adjustment of said stroke adjusting elements toward neutral position when the pressure developed by said pump exceeds a predetermined value, and means providing a lost motion connection between said last mentioned means and lever.

14. In a device of the class described, the combination with a fluid motor, of a variable stroke, reversible discharge pump for actuating said motor, stroke adjusting elements for said pump, means for actuating said elements to control the stroke and direction of discharge of said pump, said means including a floating lever, a resiliently yieldable fulcrum for said lever provided intermediate the ends thereof, means connecting said lever to said stroke adjusting elements, means operatively connected to one end of said lever for adjusting the latter to various positions of adjustment, followup means actuated by said motor for returning said lever to normal position, a second lever operatively connected to said first mentioned lever, fluid pressure means for actuating said second mentioned lever, means providing a lost motion connection between said fluid pressure means and said second mentioned lever, and means connecting said fluid pressure means to the pressure side of said pump, whereby when the pressure exceeds a predetermined value said levers will actuate said stroke adjusting elements toward neutral position.

15. In a device of the class described, the combination with a fluid motor, of a variable stroke, reversible discharge pump for actuating said motor, stroke adjusting elements for said pump, means for actuating said elements to control the stroke and direction of discharge of said pump, said last mentioned means including a floating lever, means connecting said lever to said stroke adjusting elements, a resiliently yieldable fulcrum for said lever provided intermediate the ends of the latter, cam means operatively connected to one end of said lever for adjusting the latter to various positions of adjustment, manual means for actuating said cam means, a followup means actuated by said motor for returning said cam means to normal position after adjustment by said manual means, a second lever operatively connected to said first mentioned lever, means for actuating said levers to effect adjustment of said stroke adjusting elements to neutral position when the pressure developed by said pump exceeds a predetermined value, and means providing a lost motion connection between said last mentioned means and second lever.

ALBERT R. KUZELEWSKI.